(12) United States Patent
Dupler et al.

(10) Patent No.: US 9,549,046 B1
(45) Date of Patent: Jan. 17, 2017

(54) METHODS AND SYSTEMS FOR LOGGING TIME WITH A MOBILE COMPUTING DEVICE

(71) Applicant: The Boeing Company, Seal Beach, CA (US)

(72) Inventors: Craig E. Dupler, Snohomish, WA (US); Matthew M. Fox, Lafayette, LA (US); Felicco Toney, Boston, MA (US)

(73) Assignee: The Boeing Company, Chicago, IL (US)

( * ) Notice: Subject to any disclaimer, the term of this patent is extended or adjusted under 35 U.S.C. 154(b) by 385 days.

(21) Appl. No.: 13/771,326

(22) Filed: Feb. 20, 2013

(51) Int. Cl.
*G06Q 10/10* (2012.01)
*H04L 29/06* (2006.01)

(52) U.S. Cl.
CPC .............. *H04L 67/42* (2013.01); *G06Q 10/10* (2013.01); *G06Q 10/103* (2013.01); *G06Q 10/109* (2013.01)

(58) Field of Classification Search
CPC ....... H04L 67/42; G06Q 10/10; G06Q 10/103; G06Q 10/109
USPC ........................................................ 709/203
See application file for complete search history.

(56) References Cited

U.S. PATENT DOCUMENTS

| | | | |
|---|---|---|---|
| 5,182,705 A | 1/1993 | Barr et al. | |
| 5,696,702 A | 12/1997 | Skinner et al. | |
| 5,963,914 A | 10/1999 | Skinner et al. | |
| 5,970,468 A | 10/1999 | Bull | |
| 6,789,045 B2 | 9/2004 | Lehman | |
| 6,832,176 B2 | 12/2004 | Hartigan et al. | |
| 7,072,793 B2 | 7/2006 | Lehman | |
| 7,516,220 B1* | 4/2009 | Stiert | G06F 21/55 709/203 |
| 7,623,985 B2 | 11/2009 | Finch, II et al. | |
| 8,640,137 B1* | 1/2014 | Bostic et al. | 718/104 |
| 2003/0200543 A1 | 10/2003 | Burns | |
| 2004/0025092 A1* | 2/2004 | Babutzka | G06F 11/0772 714/48 |
| 2006/0193264 A1* | 8/2006 | Bonar et al. | 370/252 |
| 2006/0293779 A1 | 12/2006 | Nishri | |
| 2007/0088638 A1* | 4/2007 | Finch et al. | 705/32 |
| 2008/0288251 A1* | 11/2008 | Cooper | G04G 21/06 704/235 |
| 2009/0006533 A1* | 1/2009 | Guo | 709/203 |
| 2009/0024240 A1* | 1/2009 | Clark et al. | 700/111 |

(Continued)

*Primary Examiner* — Brian J Gillis
*Assistant Examiner* — Amy Ling
(74) *Attorney, Agent, or Firm* — Armstrong Teasdale LLP

(57) ABSTRACT

Methods and systems for logging time are described. In one embodiment, the method is performed by a server computing device communicatively coupled to a mobile computing device and communicatively coupled to a workstation computing device executing computer-executable instructions for logging time and associated task descriptions. The server computing device includes a memory including at least one task indicator corresponding to at least one task description. The method includes receiving, by the server computing device, at a first time, a first task indicator from the mobile computing device. The method additionally includes comparing, by the server computing device, the first task indicator to the at least one task indicator in the memory of the server computing device and determining a first corresponding task description, and logging time by transmitting the first corresponding task description to the workstation computing device for logging.

17 Claims, 4 Drawing Sheets

(56) References Cited

U.S. PATENT DOCUMENTS

2011/0035260 A1\* 2/2011 Nielsen ................. G06Q 10/06
　　　　　　　　　　　　　　　　　　　　　705/7.42
2013/0266292 A1\* 10/2013 Sandrew ................. H04N 9/79
　　　　　　　　　　　　　　　　　　　　　386/282

\* cited by examiner

METHODS AND SYSTEMS FOR LOGGING TIME WITH A MOBILE COMPUTING DEVICE

BACKGROUND

The present disclosure relates generally to logging of time spent on tasks, and more particularly to logging of time spent on tasks with the use of a mobile computing device.

On a factory floor, and in other types of facilities, time spent on assembly, maintenance, or other tasks is typically logged by one or more workstation computing devices located in the facility. A significant amount of otherwise-productive time may be lost when a mechanic or worker travels from a location where a particular task is performed to one of the workstation computing devices, in order to enter a task description and the time spent on the task. In addition, time may be lost when the worker notifies an inspector or crane crew that the worker has completed a task. That is, the worker typically either travels to the workstation computing device to instruct the workstation computing device to send a notification to the inspector and/or crew, or contacts the inspector and/or crew directly.

Providing each worker with a personal digital assistant or smart phone may be prohibitively expensive. Use of such a personal digital assistant or smart phone may, however, enable each worker to perform the above procedures without needing to physically travel around the facility.

BRIEF DESCRIPTION

In one aspect, a method for logging time using a mobile computing device is provided. More particularly, in an embodiment, a server computing device is communicatively coupled to a mobile computing device and communicatively coupled to a workstation computing device for executing computer-executable instructions for logging time and associated task descriptions. The server computing device includes a memory including at least one task indicator corresponding to at least one task description. The method includes receiving, by the server computing device, at a first time, a first task indicator from the mobile computing device. The method additionally includes comparing, by the server computing device, the first task indicator to the at least one task indicator in the memory of the server computing device and determining a first corresponding task description, logging time by transmitting the first corresponding task description to the workstation computing device for logging.

In another aspect, a server computing device for facilitating logging time using a mobile computing device is provided. The server computing device is communicatively coupled to a mobile computing device and is communicatively coupled to a workstation computing device executing computer-executable instructions for logging time and associated task descriptions. The server computing device includes a processor coupled to a memory. The memory includes at least one task indicator corresponding to at least one task description and further includes computer-executable instructions that, when executed by the processor, cause the server computing device to perform the steps of receiving, at a first time, a first task indicator from the mobile computing device, comparing the first task indicator to the at least one task indicator in the memory and determining a first corresponding task description, logging time by transmitting the first corresponding task description to the workstation computing device for logging.

In another aspect, a computer-readable storage device is provided. The computer-readable storage device has computer-executable instructions embodied thereon for facilitating logging time using a mobile computing device. A server computing device is configured to communicatively couple to the mobile computing device. The server computing device includes a processor coupled to a memory. The memory includes at least one task indicator corresponding to at least one task description. When executed by the server computing device processor, the computer-executable instructions cause the server computing device to perform the steps of receiving at a first time, a first task indicator from a mobile computing device communicatively coupled to the server computing device, comparing the first task indicator to the at least one task indicator in the memory and determining a first corresponding task description, and logging time by transmitting the first corresponding task description to a workstation computing device executing computer-executable instructions for logging time and associated task descriptions.

In another aspect, a system for facilitating logging time is provided. The system includes a mobile computing device, a workstation computing device executing software for logging time and associated task descriptions, and a display that is remotely located from the mobile computing device and is communicatively coupled to the workstation computing device to display the software for logging time and associated task descriptions. The system additionally includes a server computing device that is communicatively coupled to the mobile computing device, the workstation computing device, and the display. The server computing device includes a processor coupled to a memory. The memory includes at least one task indicator corresponding to at least one task description and further includes computer-executable instructions that, when executed by the processor, cause the server computing device to perform the steps of: transmitting an instruction to the workstation computing device to activate the display, receiving at a first time, a first task indicator from the mobile computing device, comparing the first task indicator to the at least one task indicator in the memory and determining a first corresponding task description, and logging time by transmitting the first corresponding task description to the workstation computing device for logging.

DETAILED DESCRIPTION

Figure 1:
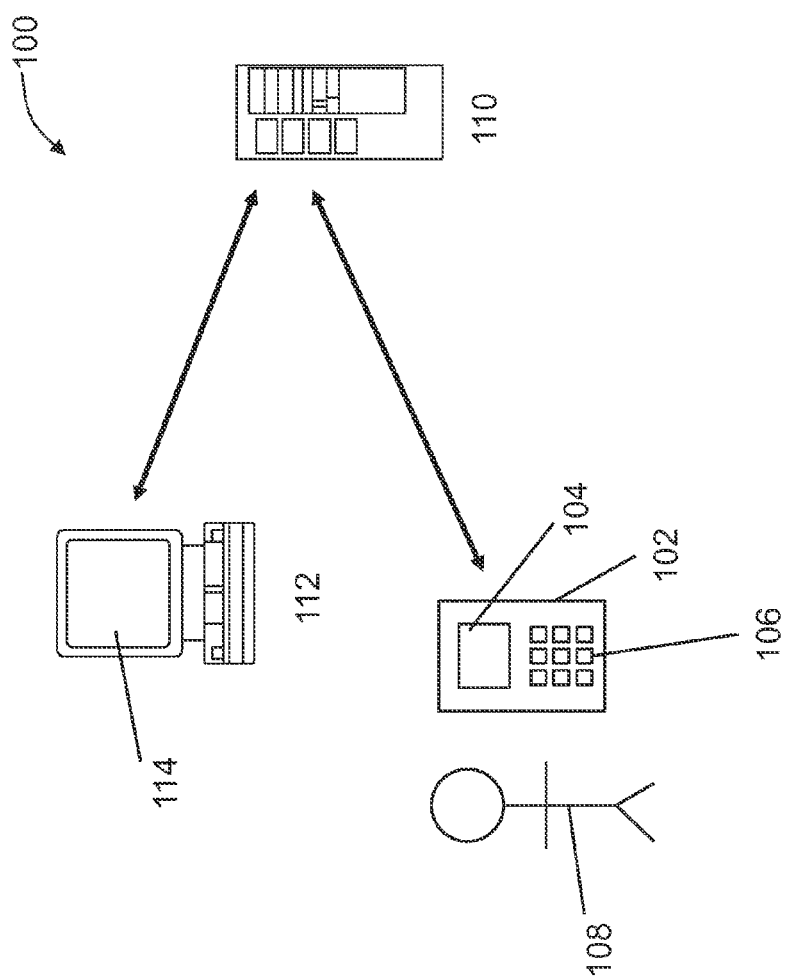
FIG. 1 is a diagram of an embodiment of a system for logging time using a mobile computing device.

FIG. 1 is a diagram of an example system 100 for logging time using a mobile computing device 102. Mobile computing device 102 is, for example, an audience polling device, a personal digital assistant, a cellular phone, or other mobile computing device for use by user 108. In the example embodiment, mobile computing device 102 includes an output device 104, for example a display, and an input device 106, for example a keypad. In some implementations, mobile computing device 102 is a simple, single-application audience polling device as described herein. Mobile computing device 102 is communicatively coupled to a server computing device 110. Server computing device 110 is communicatively coupled to workstation computing device 112, which is coupled to display 114. Server computing device 110 includes a memory containing at least one task indicator, which in one form, is a short code or string of numbers, characters, and/or other symbols, and a corresponding task description or other expanded set of information to which the task indicator corresponds. For example, a task indicator of "11" may correspond with a "begin airplane wing assembly" task description. A task indicator of "12" may correspond with an "end airplane wing assembly" task description. A task indicator of "13" may correspond with a "begin engine assembly" task description, and a task indicator of "14" may correspond with an "end engine assembly" task description. Mobile computing device 102 is configured to receive input designating a task indicator as described above from a user 108 (e.g., a mechanic) of mobile computing device 102. That is, user 108 of mobile computing device 102 may enter a task indicator using, for example, keypad 106 on mobile computing device 102.

Mobile computing device 102 is configured to transmit the entered input, for example a task indicator, to server computing device 110. Upon receipt of the entered input (e.g., a task indicator), server computing device 110 compares the entered input to the task indicators stored in memory and determines that the entered input corresponds to a particular task description. Server computing device 110 is configured to transmit a confirmation message to mobile computing device 102 with the corresponding description of the task. In some implementations, the confirmation message transmitted from server computing device 110 includes a confirmation prompt, for example "Press 1 to confirm or 2 to re-enter". Mobile computing device 102 is configured to display, through display 104, the confirmation message upon receipt from server computing device 110. If the confirmation message includes a confirmation prompt, mobile computing device 102 receives further input from the user, such as "1" or "2".

The further input is transmitted to server computing device 110. If the further input is a "1", then server computing device 110 transmits a command to workstation computing device 112 to initiate a time logging software application and transmits the task description to workstation computing device 112 for entry into the time logging software application. The time logging software application is a set of computer-executable instructions stored in a memory of workstation computing device 112. Upon receipt of the task description, workstation computing device 112 enters the task description into the time logging software application. If the further input is a "2", then server computing device 110 transmits a message to mobile computing device 102 prompting user 108 to re-enter the task indicator. That is, user 108 may have inadvertently entered an incorrect task indicator and is given another opportunity to enter a task indicator into keypad 106, to be transmitted from mobile computing device 102 to server computing device 110 as discussed above.

In some implementations, in addition to storing indicators and corresponding task descriptions, the memory of server computing device 110 includes a set of mobile computing device identifiers and corresponding user identifiers. In such implementations, messages transmitted from mobile computing device 102 include the mobile computing device identifier, thereby enabling server computing device 110 to compare the mobile computing device identifier in each message with the set of mobile computing device identifiers and associated user identifiers stored in memory to determine which user sent the message. In certain implementations, mobile computing device 102 includes a time stamp in each message and server computing device 110 extracts the time stamp from the message. In other implementations, server computing device 110 generates a timestamp when a message is received from mobile computing device 104. In some implementations, server computing device 110 transmits the user identifier and timestamp information to workstation computing device 112 with the task description discussed above.

In certain implementations, server computing device 110 is further configured to transmit a prompt to mobile computing device 102 asking whether to activate a display, such as display 114. In such implementations, mobile computing device 102 then receives an input from the user designating a display that is near the user. For example, in some implementations, system 100 may include multiple displays at various locations in a facility, each display having a number or other identifier associated with it. The user enters the identifier of a display, for example "114" and mobile computing device 102 transmits the display identifier to server computing device 110. Upon receipt of the display identifier, server computing device 110 transmits a corresponding command to the workstation computing device associated with the display, for example workstation computing device 112 and display 114, to activate display 114 and initiate the time logging software application on workstation computing device 112. Once display 114 is activated, display 114 shows the time logging software application for viewing by user 108. In some implementations, the time logging software application is fully running on the workstation computing device 112. In other implementations, the time logging software executing on workstation computing device 112 is a web page displayed in a web browser, or other client application, that relies on a corresponding server application executing on server computing device 110 for additional functionality. In certain implementations, display 114 is large enough to be seen clearly by user 108 even though user 108 is, for example, 20 meters from display 114.

When user 108 has completed a particular task, for example the "begin airplane wing assembly" task associated with indicator "11", user 108 may enter indicator "12" into mobile computing device 102. As discussed above, indicator "12" corresponds with the "end airplane wing assembly" task description. Mobile computing device 102 transmits the task indicator to server computing device 110 in the same manner discussed above, and server computing device 110 transmits a corresponding instruction to workstation computing device 112 to enter the corresponding task description into the time logging software application. That is, server computing device 110 instructs workstation computing device 112 to inform the time logging software application that the user has stopped performing the airplane wing assembly task.

In certain implementations, if user 108 immediately transitions to another task, rather than entering an indicator corresponding to the ending of a particular task, for example "12", user 108 may enter a task indicator corresponding to the beginning of a new task, for example "13". As discussed above, indicator "13" may correspond, for example, to a "begin engine assembly" task. Accordingly, server computing device 110 and/or workstation computing device 112 is configured to determine that user 108 has stopped working on the original task (e.g., "begin airplane wing assembly") and update the time logging software application accordingly. In certain embodiments, upon the ending of a particular task, server computing device 110 may transmit a notification to another mobile computing device or workstation computing device associated with an inspector or a crane crew, with information about the completed task. Accordingly, the inspector may review the work of user 108, and/or the crane crew may transport the work product to a different location.

Figure 2:
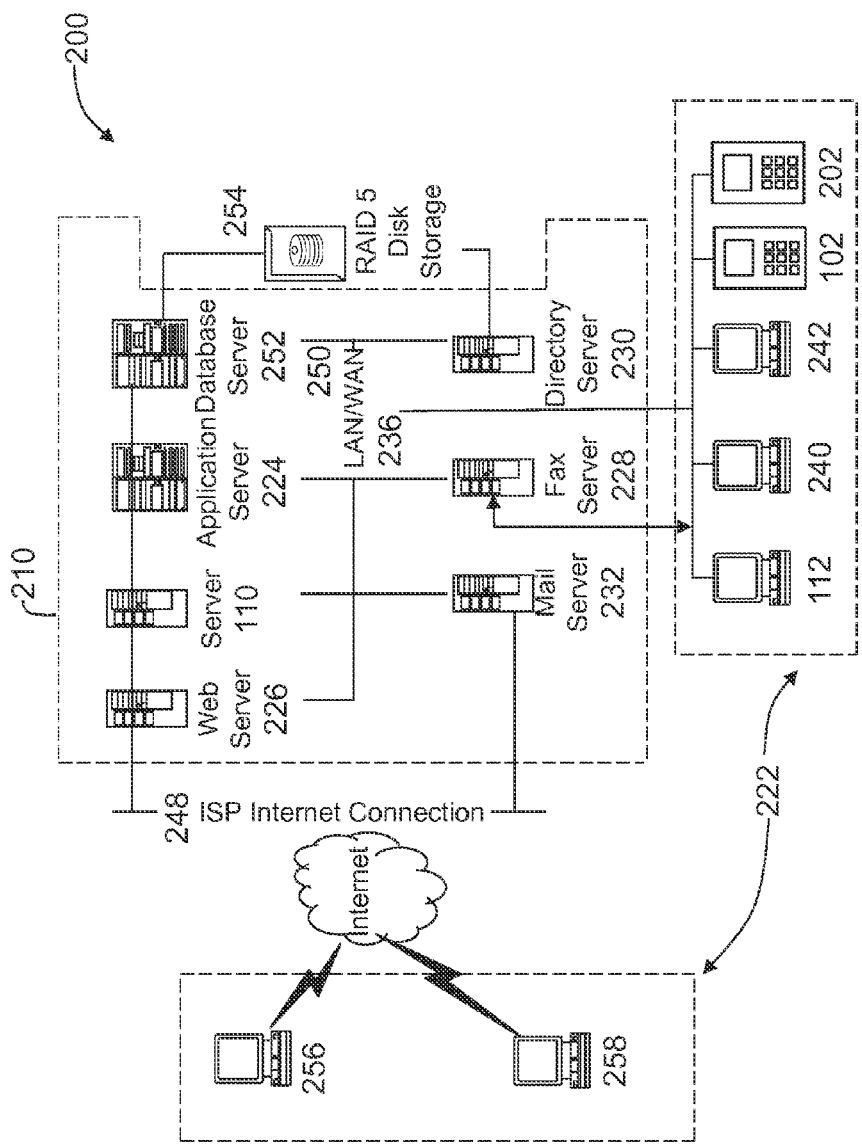
FIG. 2 is a block diagram of an embodiment of an enterprise system.

FIG. 2 is a block diagram of a larger, enterprise-type system 200. System 100, or at least the functionality of system 100 as described above, may be included within system 200. Components in system 200, identical to components of system 100 (shown in FIG. 1), are identified in FIG. 2 using the same reference numerals used in FIG. 1.

Referring specifically to FIG. 2, system 200 includes server group 210 and client systems 222. Server group 210 includes a database server 252, an application server 224, a web server 226, a fax server 228, a directory server 230, a mail server 232, and server computing device 110. A disk storage unit containing database 254 is coupled to database server 252 and directory server 230. Servers 110, 224, 226, 228, 230, 232, and 250 are communicatively coupled in a local area network (LAN) 236. In addition, workstation computing devices 112, 240, 242 and mobile computing devices 102 and 202 are coupled to LAN 236. Alternatively, workstation computing devices 112, 240, and 242 and mobile computing devices 102 and 202 are coupled to LAN 236 using an Internet link or are connected through an intranet. Each workstation computing device, 112, 240, and 242, is a computing device having a time logging software application.

Server group 210 is configured to be communicatively coupled to entities outside LAN 236 as well, such as workstation computing devices 256 and 258 using an Internet connection 248. Any other wide area network (WAN) type communication can be utilized in other implementations. In addition, and rather than WAN 250, local area network 236 could be used in place of WAN 250.

In some implementations, any authorized individual or entity having a workstation computing device 112, 240, 242, 256, 258 may access system 200. At least one of the client systems includes a manager workstation computing device 256 located at a remote location. Workstation computing devices 256 and 258 are configured to communicate with server group 210. Server computing device 110, which is in communication with mobile computing devices 102 and 202 receives and transmits information to and from mobile computing devices 102 and 202, as well as workstation computing devices 112, 240, and 242. It should be understood that any number of workstation computing devices and mobile computing devices may be included in the systems of FIGS. 1 and 2.

References herein to workstation computing device 112 initiating or executing application software, for example time logging application software, should be interpreted to mean that, in some embodiments, the application software is stored entirely in the memory of and executed exclusively by a processor in workstation computing device 112, whereas in other embodiments, the application software has a client-server architecture. In embodiments where the application software has a client-server architecture, workstation computing device 112 executes a client component of the application software, for example in a web browser, and one or more servers, for example web server 226, executes a server component of the application software.

Figure 3:
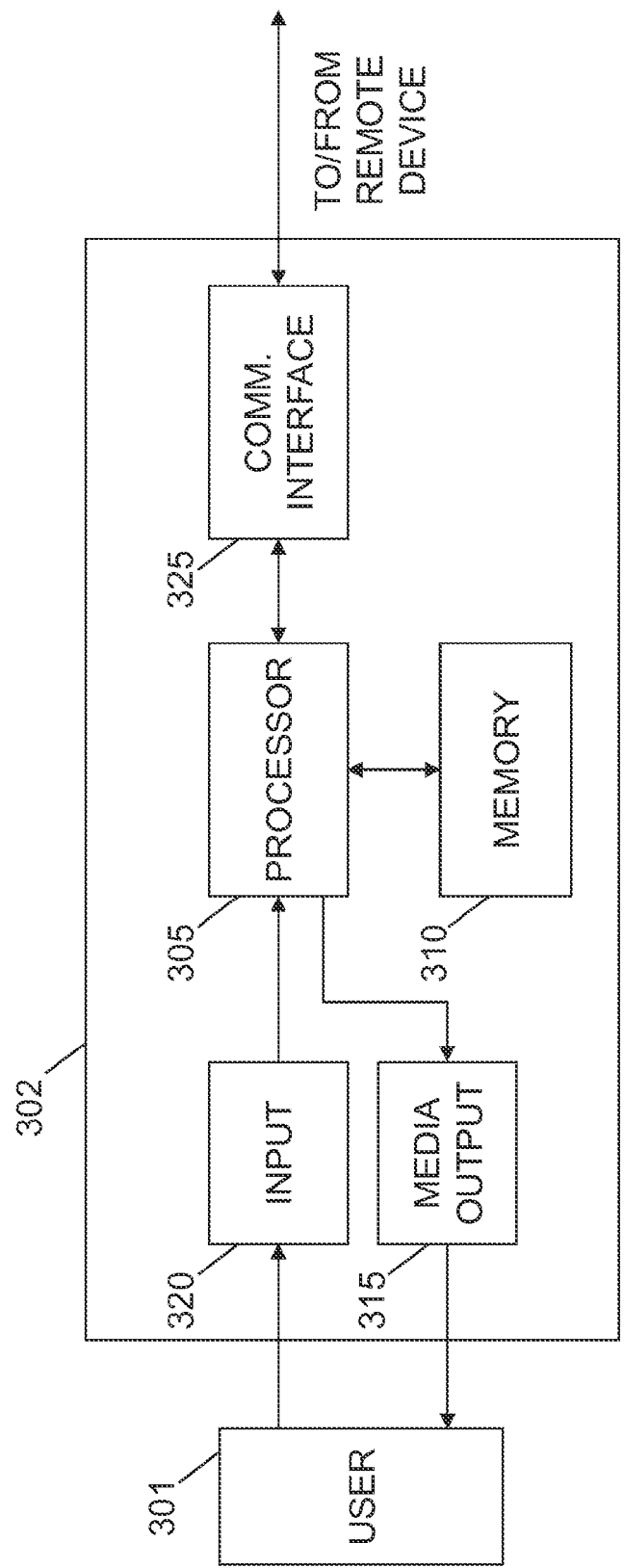
FIG. 3 illustrates an example configuration of a computing device.

FIG. 3 illustrates an example configuration of a computing device 302. Computing device 302 is representative of any of mobile computing devices 102 and 202, server computing device 110 and servers 224, 226, 228, 230, 232, and 252 of server group 210, and workstation computing devices 112, 240, 242, 256, and 258 as shown in FIGS. 1 and 2. Referring specifically to FIG. 3, computing device 302 includes a processor 305 for executing instructions. In some embodiments, executable instructions are stored in a memory area 310. Processor 305 may include one or more processing units (e.g., in a multi-core configuration). Memory area 310 is any device allowing information such as executable instructions and/or data to be stored and retrieved. Memory area 310 may include one or more computer readable storage device or other computer readable media, including transitory and non-transitory computer readable media.

Computing device 302 also includes at least one media output component 315 for presenting information to user 301. Media output component 315 is any component capable of conveying information to user 301. In some embodiments, media output component 315 includes an output adapter such as a video adapter and/or an audio adapter. An output adapter is operatively coupled to processor 305 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in media output component 315. With reference to mobile computing device 102, display 104 is one such display device. Additionally, display 114 of workstation computing device 112 is another such display device.

In some embodiments, computing device 302 includes an input device 320 for receiving input from user 301. Input device 320 may include, for example, a keyboard, a keypad, a pointing device, a mouse, a stylus, a touch sensitive panel (e.g., a touch pad or a touch screen), a gyroscope, an accelerometer, a position detector, or an audio input device. Keypad 106 of mobile computing device 102 (FIG. 1) is one such input device 320. A single component such as a touch screen may function as both an output device of media output component 315 and input device 320.

Still referring to FIG. 3, computing device 302 may also include a communication interface 325, which is communicatively couplable to a remote computing device such as any servers of server group 210 or a client system 222. Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, processor-executable instructions for providing a user interface to user 301 via media output component 315 and, optionally, receiving and processing input from input device 320. Memory area 310 may include, but is not limited to, any computer-operated hardware suitable for storing and/or retrieving computer-executable instructions and/or data. Memory area 310 may include random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Further, memory area 310 may include multiple storage units such as hard disks or solid state disks in a redundant array of inexpensive disks (RAID) configuration. Memory area 310 may include a storage area network (SAN) and/or a network attached storage (NAS) system. In some embodiments, memory area 310 includes memory that is integrated in computing device 302. For example, computing device 302 may include one or more hard disk drives as memory 310. Memory area 310 may also include memory that is external to computing device 302 and may be accessed by a plurality of computing devices 302. The above memory types are exemplary only, and are thus not limiting as to the types of memory usable for storage of processor-executable instructions and/or data.

Figure 4:
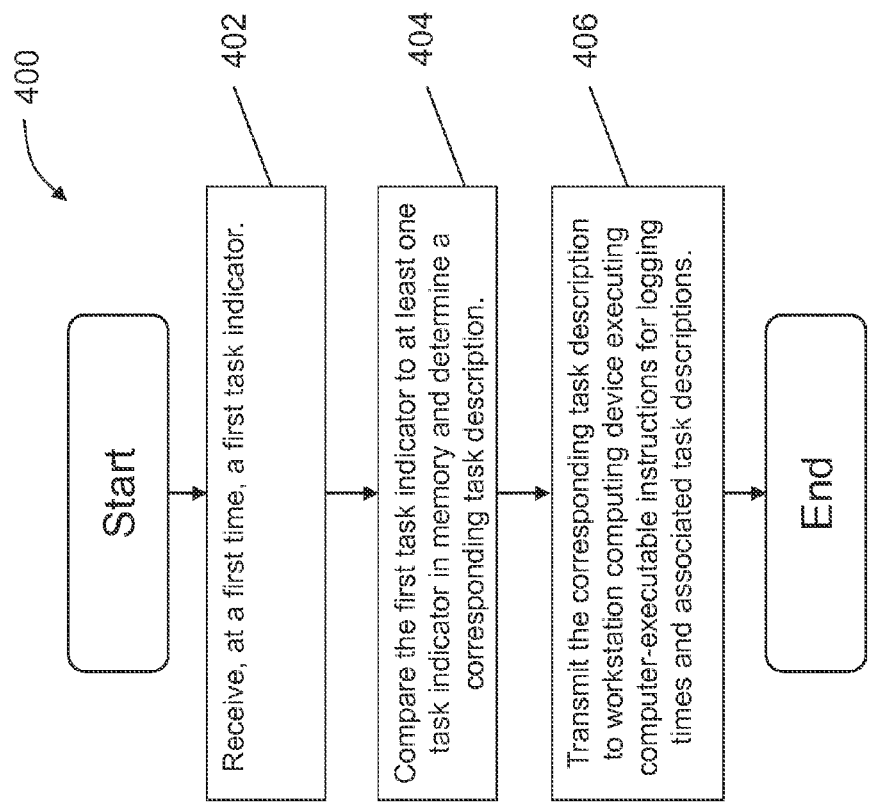
FIG. 4 is a flow chart of a method for logging time with a mobile computing device.

FIG. 4 is a flow chart of a method 400 for logging time using a mobile computing device, such as device 102. Method 400 may be practiced by a system 100 or 200 in accordance with FIGS. 1 and 2.

Referring specifically to FIG. 4, at step 402, server computing device 110 receives, from mobile computing device 102, at a first time, a first task indicator. For example, server computing device 110 may receive a task indicator containing the string "11", as discussed with reference to FIG. 1. The first task indicator may be received at, for example, 9:00 AM. At step 404, server computing device 110 compares the first task indicator to a set of task indicators in the memory 310 (FIG. 3) of server computing device 110 and determines a corresponding task description. As described with reference to FIG. 1, the corresponding task description for the first task indicator ("11") is, for example, "begin airplane wing assembly".

At step 406, server computing device 110 transmits the corresponding task description ("begin airplane wing assembly") to workstation computing device 112. Contained within memory 310 (FIG. 3) of workstation computing device 112 are computer executable instructions for a time logging software application. Accordingly, the task description transmitted to workstation computing device 112 is to be entered into the time logging software application. In some implementations, the time logging software application is already executing on workstation computing device 112. In other implementations, the task description is accompanied at least by an instruction to execute the computer readable instructions for the time logging software application. In additional implementations, server computing device 110 sends an affirmative instruction to workstation computing device 112 to enter the task description into the time logging software application, whereas in other implementations, workstation computing device 112 is configured to enter the task description and any additional information transmitted therewith into the time logging software application without an affirmative instruction from server computing device 110 to do so. System 100 may perform additional steps and functions as described with reference to FIG. 1.

A technical effect of systems and methods described herein includes at least one of: (a) receiving, at a server computing device, at a first time, a first task indicator; (b) comparing the first task indicator to at least one task indicator in a memory of the server computing device and determining a first corresponding task description; and (c) logging time by transmitting, by the server computing device, the first corresponding task description to a workstation computing device executing computer-executable instructions for logging times and associated task descriptions.

As compared to known methods and systems for logging time associated with tasks, the methods and systems described herein enable a worker to efficiently enter information pertaining to time spent on tasks without losing time traveling to a workstation to enter the information. Implementations of methods and systems for logging time spent on tasks using a mobile computing device are described above in detail. The methods and systems described herein are not limited to the specific implementations described herein, but rather, components of the systems and/or steps of the methods may be utilized independently and separately from other components and/or steps described herein.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated. This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for logging user time using a first mobile computing device, a server computing device communicatively coupled to the first mobile computing device and communicatively coupled to a workstation computing device that executes computer-executable instructions for logging user time and associated task descriptions, the server computing device including a memory including at least one task indicator corresponding to at least one task description, the method comprising:
   receiving, by the server computing device, at a first time, a first task indicator, corresponding to a first task performed by a first user, and a timestamp, corresponding to receipt of the first task indicator at the first time, from the first mobile computing device;
   comparing, by the server computing device, the first task indicator to the at least one task indicator in the memory of the server computing device and determining a first corresponding task description;
   transmitting a confirmation message from the server to the first mobile computing device, the confirmation message including the first corresponding task description;
   transmitting the first corresponding task description and the timestamp from the server computing device to the workstation computing device;
   logging, at the workstation computing device, time spent by the first user performing the first task based on the first corresponding task description and the timestamp; and
   transmitting, by the server computing device, a notification of completion of the first task by the first user to at least a second mobile computing device that is associated with a second user performing a second task that requires completion of the first task.

2. The method of claim 1, wherein determining the first corresponding task description includes determining that the first corresponding task description is associated with a beginning of the first task by the first user.

3. The method of claim 1, further comprising:
receiving at the server computing device, at a second time, a second task indicator;
comparing, by the server computing device, the second task indicator to the at least one task indicator in the memory of the server computing device and determining a second corresponding task description; and
transmitting the second corresponding task description to the workstation computing device.

4. The method of claim 3, wherein the first corresponding task description corresponds with the first task and wherein determining the second corresponding task description includes determining that the second corresponding task description is associated with an end of the first task.

5. The method of claim 3, wherein the first corresponding task description corresponds with the first task and wherein determining the second corresponding task description includes determining that the second corresponding task description is associated with a beginning of the second task by the second user.

6. The method of claim 1, further comprising:
transmitting a prompt to the first mobile computing device asking whether to activate a display coupled to the workstation computing device.

7. The method of claim 6, further comprising:
receiving an identifier of the display of the workstation computing device; and
transmitting an instruction to the workstation computing device to activate the display.

8. The method of claim 1, further comprising:
receiving a mobile computing device identifier in association with the first task indicator;
comparing the mobile computing device identifier with at least one mobile computing device identifier stored in the memory of the server computing device in association with at least one user identifier and determining a corresponding user identifier; and
transmitting the corresponding user identifier to the workstation computing device.

9. A server computing device for facilitating logging user time using a first mobile computing device, said server computing device being communicatively coupled to the first mobile computing device and communicatively coupled to a workstation computing device that executes computer-executable instructions for logging user time and associated task descriptions, said server computing device comprising a processor coupled to a memory, said memory including at least one task indicator corresponding to at least one task description and further including computer-executable instructions that, when executed by said processor, cause said server computing device to perform the steps of:
receiving at a first time, a first task indicator, corresponding to a first task performed by a first user, and a timestamp, corresponding to receipt of the first task indicator at the first time, from the first mobile computing device;
comparing the first task indicator to the at least one task indicator in said memory and determining a first corresponding task description;
transmitting a confirmation message to the first mobile computing device, the confirmation message including the first corresponding task description;
transmitting the first corresponding task description and the timestamp from the server computing device to the workstation computing device for logging time spent by the first user performing the first task based on the first corresponding task description and the timestamp; and
transmitting a notification of completion of the first task by the first user to at least a second mobile computing device that is associated with a second user performing a second task that requires completion of the first task.

10. The server computing device of claim 9, wherein said memory further contains computer-executable instructions such that determining the first corresponding task description includes determining that the first corresponding task description is associated with a beginning of the first task by the first user.

11. The server computing device of claim 9, wherein the computer-executable instructions further cause said server computing device to perform the steps of:
receiving, at a second time, a second task indicator;
comparing the second task indicator to the at least one task indicator in said memory and determining a second corresponding task description; and
transmitting the second corresponding task description to the workstation computing device.

12. The server computing device of claim 11, wherein the first corresponding task description corresponds with the first task and wherein said memory further includes computer-executable instructions such that determining the second corresponding task description includes determining that the second corresponding task description is associated with an end of the first task.

13. The server computing device of claim 11, wherein the first corresponding task description corresponds with the first task and wherein said memory further includes computer-executable instructions such that determining the second corresponding task description includes determining that the second corresponding task description is associated with a beginning of the second task by the second user.

14. The server computing device of claim 9, wherein the computer-executable instructions further cause said server computing device to perform the steps of:
transmitting a prompt to the first mobile computing device asking whether to activate a display coupled to the workstation computing device;
receiving an identifier of the display of the workstation computing device; and
transmitting an instruction to the workstation computing device to activate the display.

15. The server computing device of claim 9, wherein the computer-executable instructions further cause said server computing device to perform the steps of:
receiving a mobile computing device identifier in association with the first task indicator;
comparing the mobile computing device identifier with at least one mobile computing device identifier stored in said memory in association with at least one user identifier and determining a corresponding user identifier; and
transmitting the corresponding user identifier to the workstation computing device.

16. A computer-readable storage device having computer-executable instructions embodied thereon for facilitating logging user time using a first mobile computing device, wherein, a server computing device configured to communicatively couple to the first mobile computing device, the server computing device including a processor coupled to a memory including at least one task indicator corresponding to at least one task description, when executed by the server computing device processor, the computer-executable instructions cause the server computing device to perform the steps of:

receiving at a first time, a first task indicator, corresponding to a first task performed by a first user, and a timestamp, corresponding to receipt of the first task indicator at the first time, from the first mobile computing device communicatively coupled to the server computing device;

comparing the first task indicator to the at least one task indicator in the memory and determining a first corresponding task description;

transmitting a confirmation message to the first mobile computing device, the confirmation message including the first corresponding task description;

transmitting the first corresponding task description and the timestamp from the server computing device to a workstation computing device executing computer-executable instructions for logging time spent by the first user performing the first task based on the first corresponding task description and the timestamp; and transmitting a notification of completion of the first task by the first user to at least a second mobile computing device that is associated with a second user performing a second task that requires completion of the first task.

17. A system for facilitating logging user time, said system comprising:

a first mobile computing device associated with a first user;

a workstation computing device executing software for logging user time and associated task descriptions;

a display that is remotely located from said first mobile computing device and is communicatively coupled to said workstation computing device to display the software for logging user time and associated task descriptions; and a server computing device that is communicatively coupled to said first mobile computing device, said workstation computing device, and said display, said server computing device comprising a processor coupled to a memory, said memory including at least one task indicator corresponding to at least one task description and further including computer-executable instructions that, when executed by said processor, cause said server computing device to perform the steps of:

transmitting an instruction to the workstation computing device to activate said display;

receiving at a first time, a first task indicator, corresponding to a first task performed by the first user, and a timestamp, corresponding to receipt of the first task indicator at the first time from the first mobile computing device;

comparing the first task indicator to the at least one task indicator in said memory and determining a first corresponding task description;

transmitting a confirmation message to the first mobile computing device, the confirmation message including the first corresponding task description;

transmitting the first corresponding task description and the timestamp to the workstation computing device for logging time spent by the first user performing the first task based on the first corresponding task description and the timestamp; and transmitting a notification of completion of the first task by the first user to at least a second mobile computing device that is associated with a second user performing a second task that requires completion of the first task.

\* \* \* \* \*